United States Patent [19]
Burgoyne, Jr. et al.

[11] Patent Number: 4,931,182

[45] Date of Patent: Jun. 5, 1990

[54] MEMBRANES FORMED FROM UNSATURATED POLYIMIDES

[75] Inventors: William F. Burgoyne, Jr., Emmaus; Michael Langsam, Allentown; Michael E. Ford, Coopersburg; Jeremiah P. Casey, Emmaus, all of Pa.

[73] Assignee: Air Products and Chemicals, Inc., Allentown, Pa.

[21] Appl. No.: 433,495

[22] Filed: Nov. 8, 1989

[51] Int. Cl.$^5$ .............................................. B01D 13/00
[52] U.S. Cl. ................................. 210/500.39; 528/310
[58] Field of Search .................... 210/500.37, 500.38, 210/500.39, 500.28, 500.27; 528/310, 312, 314, 315–318, 322, 327, 328, 329.1, 330, 331, 332

[56] References Cited

U.S. PATENT DOCUMENTS

| Re. 30,351 | 7/1980 | Hoehn et al. | 55/16 |
|---|---|---|---|
| 3,822,202 | 7/1974 | Hoehn | 210/23 |
| 4,378,400 | 3/1983 | Mahano et al. | 428/220 |
| 4,657,564 | 4/1987 | Langeam | 55/16 |
| 4,705,540 | 11/1987 | Hayes | 55/16 |
| 4,717,393 | 1/1988 | Hayes | 55/16 |
| 4,717,394 | 1/1988 | Hayes | 55/16 |

OTHER PUBLICATIONS

T. H. Kim et al., "Reverse Pemuii Active" of $N_2$ Over $CH_4$ in Aromatic Polyimides, Journal of Applied Polymer Paint, vol. 34, (1987) 1767–1771.

*Primary Examiner*—Frank Sever
*Attorney, Agent, or Firm*—Mark L. Rodgers; William F. Marsh; James C. Simmons

[57] ABSTRACT

The present invention is a class of polyimide membranes containing copolymerizable, surface modifiable units containing both aromatic diamines and alkenylated diamines having a vinyl or vinylaryl group preferably positioned ortho to an amine functionality. The polyimide membranes can be crosslinked by treatment with an activating force such as high energy electromagnetic irradiation or with a free radical source to impart high selectivity to the membrane without causing a large decrease in composite permeance.

15 Claims, No Drawings

MEMBRANES FORMED FROM UNSATURATED POLYIMIDES

TECHNICAL FIELD

The present invention relates to polymeric membranes, and in particular to membranes formed from polyimides for gas separation applications.

BACKGROUND OF THE INVENTION

There is a need for improved polymeric materials that are highly permeable, yet may under certain circumstances, provide selective separation of various gas combinations. Such materials would especially be useful in commercial, non-cryogenic gas separation processes.

The commercial application for gas separation devices based on polymeric materials relies, in part, on maximizing the overall gas flux through the membrane. P. H. Kim, et al., J. Appl. Poly. Sci., 34 1761 (1987), reported that the gas flux for a membrane is relatable to the average space between the polymer chains. In addition, they indicated that the density of the polymer is also related to the overall gas flux. The problem, in part, for these commercial applications is to identify polymers with very high flux and with good thermomechanical properties. It has generally been observed that to achieve high overall flux requires having a polymer with low chain-chain interactions. This can be exemplified by polymers such as poly(dimethylsiloxane) or poly(4-methyl-1-pentene). These materials have rather high gas flux values. These high flux materials have, because of their low chain-chain interaction, low glass transition temperatures (Tg). As a consequence, these materials require either special processing conditions to build in chemical and physiochemical crosslinking or they can be used only at rather low application temperatures. By contrast, polymers with strong chain-chain interactions have rather high Tg values and have usually exhibited rather low gas flux.

Polyimides, which generally have strong chain-chain interactions and have high Tg values, have been reported to have good gas flux values for certain specific structures. Specifically, U.S. Pat. No. 3,822,202 (1974); Re 30,351 (1980) discloses a process for separating fluids using a semipermeable membrane made from polyimides, polyesters or polyamides. The repeating units of the main polymer chain of these membranes are distinguished in that such repeating units have at least one rigid divalent subunit, the two main chain single bonds extending from which are not colinear, is sterically unable to rotate 360° around at least one of these bonds, and has 50% or more of its main chain atoms as members of aromatic rings.

U.S. Pat. No. 4,705,540 discloses a highly permeable aromatic polyimide gas separation membrane and processes for using said membrane. The membrane is an aromatic polyimide membrane in which the phenylenediamines are rigid and are substituted on essentially all of the positions ortho to the amino substituents, and the acid anhydride groups are essentially all attached to rigid aromatic moieties.

U.S. Pat. Nos. 4,717,393 and 4,717,394 teach polymeric membranes and processes using the membranes for separating components of the gas mixture. The membranes disclosed in both of these patents are semi-flexible, aromatic polyimides, prepared by polycondensation of dianhydrides with phenylenediamines having alkyl substituents on all ortho positions to the amine functions, or with mixtures of other, non-alkylated diamines, some components have substituents on all positions ortho to the amine functions. It is taught that the membranes formed from this class of polyimides exhibit improved environmental stability and gas permeability, due to the optimization of the molecular free volume in the polymer. It is also taught that such membranes can be photochemically crosslinked, which in some instances results in a better performing membrane.

U.S. Pat. No. 4,378,400 discloses gas separation membranes formed from aromatic polyimides based upon biphenyltetracarboxylic dianhydride for separating various gas mixtures.

Additionally, attempts have been made to synthesize membranes having high flux and high selectivity by creating a composite structure on the polymeric membrane surface by means of a chemical reaction between a labile function in the polymer and some "activating force". Such methods are taught in U.S. Pat. No. 4,657,564 wherein poly(1-trimethylsilylpropyne) is treated with a dilute fluorine gas stream and in U.S. Pat. No. 4,717,393 wherein a polyimide containing a benzophenone-containing linking group is irradiated with a medium pressure mercury lamp.

BRIEF SUMMARY OF THE INVENTION

The present invention is an improved class of membranes formed from polyimides containing copolymerizable, surface modifiable units containing both aromatic diamines and alkenylated diamines having a vinyl or vinylaryl group. In a preferred embodiment, the vinyl or vinylaryl group is positioned ortho to an amine functionality. The polyimides making up the membrane can be crosslinked by treatment with an activating force such as high energy electromagnetic irradiation or a free radical source, to form a thin film of crosslinked polymer at the membrane surface. The thin film of crosslinked polymer provides enhanced selectivity for various gas separation applications, especially $O_2/N_2$ separation, without resulting in a large decrease in the flux of the permeate gas through the membrane.

DETAILED DESCRIPTION OF THE INVENTION

The present invention is a class of membranes formed from polyimides containing copolymerizable, surface modifiable units containing both aromatic diamines and also alkenylated diamines having a vinyl or vinylaryl group. The polyimides from which the membranes are formed have the general structural formula:

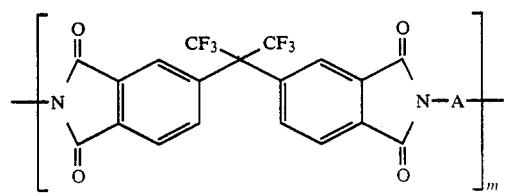

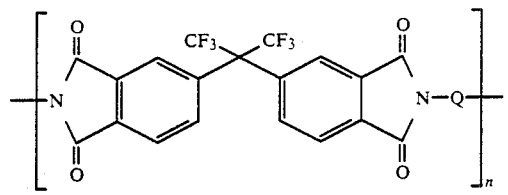

where

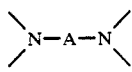

is any aromatic diamine which is capable of forming a polyimide;

Q is an alkenylated phenylene or diphenylene having the general structural formulas:

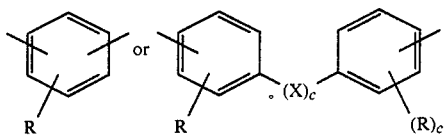

wherein each R is independently a vinyl or vinylaryl group; X is methylene, alkylene, or $C_1$-$C_6$ branched alkylene group, oxygen, sulfur, sulfonyl, carbonyl or fluoroalkylene, each c is independently 0 or 1 and m and n are integers such that the ratio of m:n is from 0.1 to 99.9.

More specifically, when R is an vinyl group it can be represented by the general structural formula:

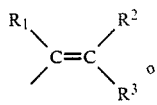

wherein $R^1$, $R^2$ and $R^3$ are hydrogen, $C_{1-3}$ aliphatic, phenyl, halogen or alkoxy radicals, or $R^1$ and $R^2$ are bridged via an alkylene radical —$(CH_2)_y$— wherein y=2 to 5.

In embodiments in which R is an vinylaryl group, it can be represented by the general structural formula:

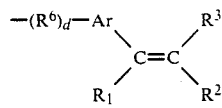

wherein $R^6$ is —$CH_2$—; Ar is phenylene or substituted phenylene, d=0 or 1 and $R^1$, $R^2$ and $R^3$ are described above.

It has now been found that Q moieties having the structures set out above can be polymerized into the imide chain and will respond to simple crosslinking reactions. It is the presence of the unsaturated hydrocarbon radical; i.e., the vinyl or vinylaryl group which acts as a surface modifier and permits a densification of the surface. Consequently various other substituents may be present on the phenylene or diphenylene structure as long as one substituent is an R group as described above. Crosslinking is carried out by exposing the polymer to any suitable activating force, such as high energy electromagnetic irradiation, such as longwave and shortwave UV irradiation and x-ray irradiation with and without photo sensitizers. Alternatively, the activating force may be a free radical source which is contacted with the surface of the polymer, which include volatile peresters, peroxides and azo compounds followed by thermal activation with or without metal accelerators.

The surface modification; i.e. densification, processes create a composite polymer film wherein the bulk of the material, with a combination of high flux and low selectivity, provide mechanical support for an insitu crosslinked surface layer which imparts high selectivity without causing a drastic reduction in the composite permeance. The thus formed polymer films can be used as membranes in any desired configuration such as flat sheets or hollow fibers, and are suitable for a wide variety of gas separation and pervaporation applications, especially $O_2/N_2$ separation.

The membranes of the present invention may be formed from polyimides having only the above structural units, or may be copolymerized with other polyimide structures. Preferred polyimide structural units which may be copolymerized with units of the above formula can be generally represented by the formula:

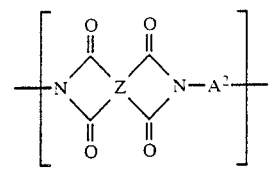

where $A^2$ is any aromatic diamine and
Z is

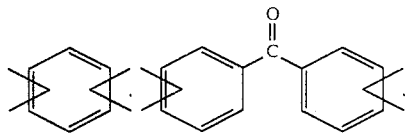

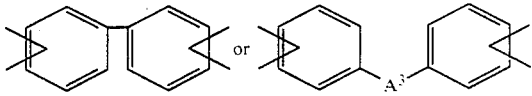

wherein $A^3$ is $C(CH_3)_2$, O, S or $SO_2$.

In addition to the above polyimide structures, minor amounts of other monomer units may be present which do not affect the gas separation properties of the resultant membrane.

The alkylation chemistry developed by Air Products and Chemicals, Inc. as described in U.S. Pat. No. 4,714,778 and EPO publication No. 277596 can be used to prepare a wide variety of aromatic diamines where an unsaturated hydrocarbon radical is positioned ortho to an amine function. A number of preferred materials which can be made by these methods and subsequently incorporated into a polyimide structure include:

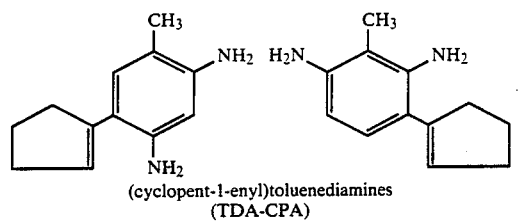

(cyclopent-1-enyl)toluenediamines
(TDA-CPA)

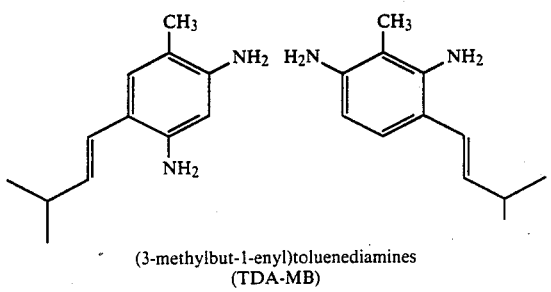

(3-methylbut-1-enyl)toluenediamines
(TDA-MB)

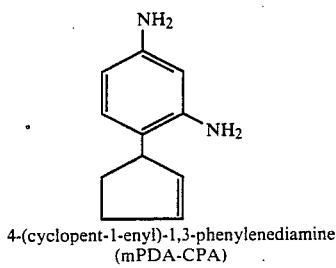

4-(cyclopent-1-enyl)-1,3-phenylenediamine
(mPDA-CPA)

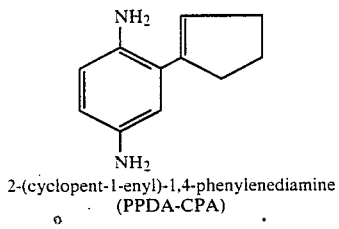

2-(cyclopent-1-enyl)-1,4-phenylenediamine
(PPDA-CPA)

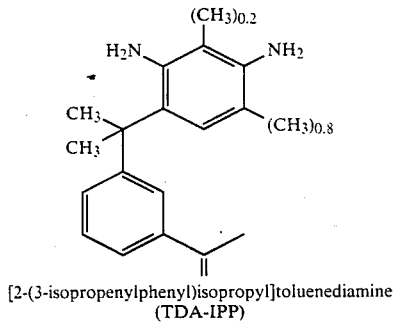

[2-(3-isopropenylphenyl)isopropyl]toluenediamine
(TDA-IPP)

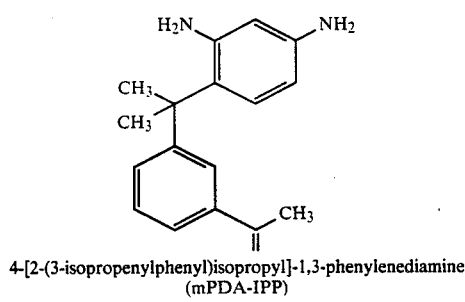

4-[2-(3-isopropenylphenyl)isopropyl]-1,3-phenylenediamine
(mPDA-IPP)

The common feature of aromatic diamines used in this invention is the presence of vinylic groups. The number and placement of vinyl groups varies according to which diamine is used, as well as the instance of conjugation verse nonconjugation with the aromatic ring. It is the presence of these "ene" substituents which offer the possibility for chemical or radiation induced crosslinking.

The "ene"-containing diamines are polymerized with other desired diamines and dianhydrides in a terniary mixture under general polymerization conditions suitable for polyimide formation. The resultant polyimide is subsequently cast into membrane form, such as a flat sheet or hollow fiber. Crosslinking, as described above, may be carried out on the polymer prior to or after it is cast into a membrane, although it is preferred to crosslink in the final form of dried polymer membrane.

The polyimide membranes of the present invention are useful in gas separation applications, especially for the recovery of oxygen from an $O_2/N_2$ stream or from air. The gas mixture to be separated is simply brought into contact with the membrane, whereby one or more components is selectively permeated through the membrane. The crosslinked membranes exhibit enhanced selectivity without a drastic reduction in flux.

The following examples are presented to better illustrate the present invention and are not meant to be limiting.

EXPERIMENTAL PROCEDURE

Preparation of Polyimides by Condensing 6F-Dianhydride with Aromatic Diamines General Procedure: The following procedures were used to prepare polyimides by condensing 5,5'-[2,2,2-trifluoro-1-(trifluoromethyl)ethylidine]bis-1,3-isobenzofuranedione (6F-dianhydride) with the aromatic diamine mixtures indicated in Tables 1 and 6. Variations in polymerization reaction parameters between the different aromatic diamine mixtures reflect the specific conditions required to obtain good, film-forming polyimides.

Polyamic Acid Preparation: A 20.000 g (0.04502 mol) portion of 6F-dianhydride was added proportionately through the course of 0.5 hr. to a solution of 0.04502 mols of the aromatic diamine mixture in anhydrous N,N-dimethyl acetamide (DMAC). During the addition, the mixture was stirred mechanically under an inert nitrogen blanket. The initial reaction temperature for a given aromatic diamine mixture is indicated in Tables 1 and 6. The amount of DMAC used was determined by the percent solids concentration also indicated in Tables 1 and 6. Approximately one hour after the addition of dianhydride, the reaction temperature was brought to 25° C. and the reaction mixture was stirred 17 hours. This polyamic acid solution was used directly in preparing the corresponding polyimide solution.

Polyimide Preparation: The solids concentration of the polyamic acid solution was adjusted with DMAC values indicated in the Tables 1 and 6. Acetic anhydride (9.18 g, 0.0900 mol) and 2.27 g (0.0225 mol) of triethylamine were added to the polyamic acid solution. The solution was then heated to 60° C. for 3 hours with stirring. After cooling, the polyimide solution was cast on glass plates. Polyimide films of ca. 100 micron thickness were obtained after vacuum drying at 70° C./200 mm Hg for 8 hours, then 100° C./0.5 mm Hg for 16 hours followed by 225° C. at 0.2 mm Hg for 8 hours. The polyimide films were then removed from the glass. In all cases the films were capable of withstanding a 150 psig pressure differential in a gas permeability test cell.

EXAMPLES 1-4

Several polyimide copolymers were prepared using different diamines containing either vinyl or vinylaryl sites in the comonomer mixture. The synthesis and physical properties of these polyimides are detailed in Table 1.

mixture. These membranes were exposed to UV irradiation from a Henovia 450 watt medium pressure lamp for different times. The oxygen and nitrogen gas permeability coefficients of these different films was determined in a CSI-135 gas permeability cell (Customer Scientific Industries; Whippany, N.J.). Using a series resistance model for the cal- culations, the permeance

TABLE 1
Synthesis Physical Properties of Polyimide Copolymers

[Polymer structure: copolymer with 0.95 mole fraction of durenediamine-6FDA unit and 0.05 mole fraction of 6FDA-N-Q unit]

| Example | Q | Initial Polyamic Acid Reaction Temp. | % Solids Polyamic Acid Solution | % Solids Imidization | Polyimide Film Tg | Polyimide Film IV | Density |
|---|---|---|---|---|---|---|---|
| 1 | [tetramethyl-substituted biphenyl-type structure with (CH₃)₀.₃ substituents, isopropylidene linkage, and vinyl (CH=CH₂) group — TDA-IPP] | 0 | 25 | 15 | >400 | .70 | 1.22 |
| 2 | [structure with CH₃/CH₃ isopropylidene linkage between two aryl rings with vinyl CH=CH₂ group] | 0 | 25 | 15 | >400 | .543 | 1.19 |
| 3 | [tetramethyl aryl with (CH₃)₀.₃ substituents and cyclopentenyl group] | 25 | 25 | 15 | >400 | .77 | — |
| 4 | [dimethyl aryl with cyclopentenyl group] | 25 | 25 | 15 | >400 | — | — |

EXAMPLES 5-9

Polymeric membranes were prepared from the copolyimide of example 1; TDA-IPP at 5 mole % and durenediamine (DDA) at 95 % mole % in the diamine (P/1) of the reacted layer in these UV treated films was determined (see Henis and Tripodi, J. Memb. Sci 8,233 (1981) for calculational procedure). These results are summarized in Table 2.

TABLE 2
Effects of UV Radiation on DDA + TDA-IPP Polyimide

| Example | 5 | 6 | 7 | 8 | 9 |
|---|---|---|---|---|---|
| UV Time (Min) | 0 | 15 | 21 | 30 | 60 |
| Thickness (cm × $10^{+4}$) | — | 104 | 104 | 88 | 115 |
| $P(O_2)$ [1] | 153.9 | 131.0 | 107.9 | 46.7 | 28.7 |
| $P/l(N_2)$ [2] | — | .847 | .347 | .0762 | .0307 |
| $P/l(N_2)$ [1] | 38.0 | 29 | 23.4 | 7.1 | 3.6 |
| $P/l(N_2)$ [2] | — | .118 | .059 | .01 | .0035 |
| $\alpha(P)$ [3] | 4.05 | 4.5 | 4.6 | 6.6 | 8.0 |
| $\alpha(P/l)$ [4] | — | 7.2 | 5.9 | 7.6 | 8.8 |

[1] P in barrers
[2] P/l in barrers/cm × $10^{+5}$
[3] based on composite P
[4] based on calculated P/l The results reported in Table 2 above show increasing $O_2/N_2$ selectivities with increasing UV radiation times for the samples tested.

EXAMPLES 10-11

Polymeric membranes were prepared from copolyimide of example 2; MPDA-IPP at 5 mole % and durenediamine (DDA) at 95 mole % in the diamine mixture. These membranes were UV treated as in examples 5-9 and their gas permeability coefficients were measured. These results are summarized in Table 3.

TABLE 3
UV Irradiation of DDA + mPDA-IPP Crosslinkable Polyimide

| Example | 10 | 11 |
|---|---|---|
| UV Time (Min) | 0 | 15 |
| Thickness[1] | 96 | 101 |
| P(N$_2$)[2] | 30.8 | 18.4 |
| P/l(N$_2$)[3] | — | .0452 |
| P(O$_2$)[2] | 100.9 | 77.7 |
| P/l(O$_2$)[3] | — | .334 |
| α(P)[4] | 3.28 | 4.47 |
| α(P/l)[5] | — | 7.39 |

[1] Thickness cm × 10$^{-4}$
[2] P in barrers
[3] P/l in barrers/cm × 10$^{+5}$
[4] α(P) separation factor based on P
[5] α(P/l) separation factor based on P/l The results reported in Table 3 above for examples 10 and 11 show a significant increase in $O_2/N_2$ selectivity for the crosslinked polymer compared to the same polymer which has not been crosslinked.

EXAMPLES 12-18

Polymeric membranes were prepared from the copolyimide of example 3; TDA-CPA at 5 mole % and durenediamine (DDA) at 95 mole % in the diamine mixture. These membranes were UV treated as in examples 5-9 and then gas permeability coefficients were measured. These results are summarized in Table 4.

TABLE 4
Effects of Irradiation on DDA + TDA-CPA Polyimide

| Example[1] | 12 | 13 | 14 | 15 | 16 | 17 | 18 |
|---|---|---|---|---|---|---|---|
| Thickness cm × 10[14] | 124 | 177 | 136 | 138 | 151 | 137 | 119 |
| UV Time (Min) | 0 | 0 | 0 | 10 | 10 | 15 | 30 |
| $P(N_2)$[2] | 48.8 | 31.13 | 33.66 | 16.14 | 15.98 | 7.34 | 2.53 |
| $P/l(N_2)$[3] | — | — | — | .0232 | .0208 | .0063 | .0922 |
| $P(O_2)$[2] | 164.6 | 113.2 | 123.1 | 86.25 | 84.75 | 67.6 | 28.4 |
| $P/l(O_2)$[3] | — | — | — | .232 | .198 | .0837 | .0288 |
| $\alpha(P)$[4] | 3.37 | 3.63 | 3.66 | 5.34 | 5.30 | 9.1 | 11.2 |
| $\alpha(P/l)$[5] | — | — | — | 10.0 | 9.52 | 13.3 | 13.1 |

[1] Thickness cm × 10[14]
[2] P in barriers
[3] P/l in barriers/cm × 10[+5]
[4] based on composite P
[5] based on calculated P/l The results reported in Table 4 show the significant increase in selectivity which accompanies the degree of crosslinking for the subject polymer.

EXAMPLES 19–27

Polymeric membranes were prepared from copolyimide of example 4; mPDA-CPA at 5 mole % and durenediamine at 95 mole % in the diamine mixture. These membranes were UV treated as in examples 5–9 and then gas permeability coefficients were measured. These results are summarized in table 5.

TABLE 5
Effects of Irradiation on mPDA-CPA + DDA Polyimide

| Example | 19 | 20 | 21 | 22 | 23 | 24 | 25 | 26 | 27 |
|---|---|---|---|---|---|---|---|---|---|
| Thickness[1] | 109 | 188 | 125 | 213 | 159 | 161 | 141 | 153 | 148 |
| UV Time (Min) | — | 0 | 0 | 0 | 10 | 10 | 10 | 10 | 15 |
| P(N$_2$)[2] | 52.4 | 47.92 | 45.12 | 46.78 | 13.51 | 17.13 | 8.18 | 18.19 | 18.6 |
| P/l(N$_2$)[3] | — | — | — | — | .0120 | .0168 | .00612 | .0195 | .0195 |
| P(O$_2$)[2] | 188.4 | 152.2 | 159.5 | 164.1 | 85.23 | 83.79 | 48.07 | 109.4 | 97.8 |
| P/l(O$_2$)[3] | — | — | — | — | .116 | .110 | .0489 | .230 | .137 |
| α(P)[4] | 3.60 | 3.18 | 3.54 | 3.51 | 6.31 | 4.89 | 5.88 | 6.01 | 5.25 |
| α(P/l)[5] | — | — | — | — | 9.67 | 6.55 | 7.99 | 11.8 | 7.02 |

[1] Thickness cm × 10$^{-4}$
[2] P in barriers
[3] P/l in barrers/cm × 10$^{+5}$
[4] α(P) separation factor based on P
[5] α(P/l) separation factor based on P/l As with the previous examples, examples 15 and 16 clearly demonstrate the increase in selectivity which results from polymer crosslinking.

EXAMPLES 28–31 (COMPARATIVE)

The above examples demonstrate the effectiveness of a variety of unsaturated aromatic diamines in a polyimide structure for UV sensitized crosslinking. An alternative approach which has been reported is using benzophenone dianhydride (BTDA). The U.V. activated crosslinking process with BTDA relies upon an activation of the aromatic carbonyl structure to form a crosslinked structure. In order to compare the relative properties of a BTDA system to that of the unsaturated systems, BTDA polymer membranes were synthesized and treated with UV irradiation under the same general conditions as the unsaturated systems in the previous examples. The treated BTDA systems, along with a control, were tested for oxygen and nitrogen permeance and selectivity and the results are reported in Table 6 below.

TABLE 6
Effects of UV Irradiation on Benzophenone Dianhydride Polyimides

| EXAMPLE | 28 | 29 | 30 | 31 |
|---|---|---|---|---|
| UV (Time) Min | 0 | 15 | 10 | 7.5 |
| Thickness[1] | — | 102 | 136 | 105 |
| P(O$_2$)[2] | 148.9 | 86.7 | 93.3 | 97.9 |
| P/l(O$_2$)[3] | — | .203 | .184 | .272 |
| P(N$_2$)[2] | 45.2 | 15.9 | 23.1 | 30.3 |
| P/l(N$_2$)[3] | — | .240 | .0347 | .0875 |
| α(P)[4] | 3.29 | 5.45 | 4.04 | 3.23 |
| α(P/l)[5] | — | 8.46 | 5.30 | 3.11 |

Initial Polyamic Acid Reaction Temp = 0° C.
Polyamic Acid Reaction Time = 17h
% Solids during Polyamic Acid Formation = 20%
% Solids during Polyamide Formation = 15%
Drying Conditions for film:
100° C./ .2 mm Hg 16 hrs.
225° C./ .2 mm Hg 8 hrs.
[1]Thickness — in cm × 10$^{+4}$
[2]P in barrers
[3]P/l in barrers/cm × 10$^{+5}$
[4]Selectivity on composite film
[5]Selectivity on series resistance model The results reported above for the BTDA systems show that, unlike the unsaturated systems of the present invention, P/l (O₂) is rather flat over the range of irradiation times, and O₂/N₂ selectivity remains generally poor, with UV treatment having a much less dramatic effect.

Having thus described the present invention, what is now deemed appropriate for Letters Patent is set out in the following appended claims.

What is claimed is:

1. A semi-permeable membrane formed of a polyimide containing copolymerizable, surface modifiable units of the formula:

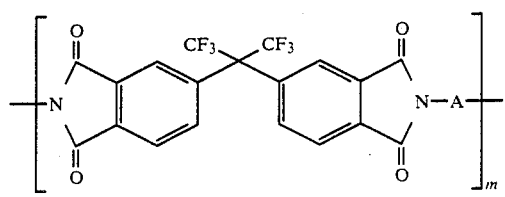

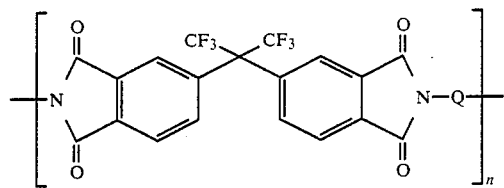

where N—A—N is an aromatic diamine;
Q is an alkenylated phenylene or diphenylene containing a vinyl or vinylaryl group; and
m an n are integers such that the ratio of m:n is from 0.1 to 99.

2. A membrane in accordance with claim 1 which has been contacted with a source of high energy electromagnetic irradiation to effect surface modification among the co-polymerizable units.

3. A membrane in accordance with claim 2 wherein said source of high energy electromagnetic irradiation is selected from the group consisting of longwave UV irradiation, shortwave UV irradiation and X-ray irradiation with and without photo sensitizers.

4. A membrane in accordance with claim 1 which has been contacted with a free radical source.

5. A membrane in accordance with claim 4 which has been contacted with a free radical source selected from the group consisting of volatile peresters, peroxides and azo compounds followed by thermal activation with or without metal accelerators.

6. A membrane in accordance with claim 1 wherein Q is an alkenylated phenylene having the general structural formula:

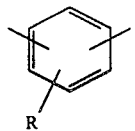

wherein each R is independently a vinyl or vinylaryl group.

7. A membrane in accordance with claim 6 wherein R is an allyl group having the general structural formula:

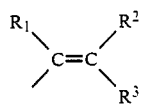

wherein $R^1$, $R^2$ and $R^3$ are hydrogen, $C_1$-$C_3$ aliphatic, phenyl, halogen or alkoxy radicals or $R^1$ and $R^2$ are bridged via an alkylene radical —(CH₂)$_y$—wherein y=2 to 5.

8. A membrane in accordance with claim 6 wherein R is an allylaryl group having the general structural formula:

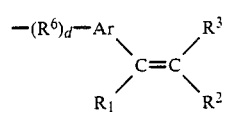

wherein $R^6$ is —CH₂—, Ar is phenylene or substituted phenylene, d=0 or 1 and $R^1$, $R^2$ and $R^3$ are hydrogen, $C_1$-$C_3$ aliphatic, phenyl, halogen or alkoxy radicals or $R^1$ and $R^2$ are bridged via an alkylene radical —(CH₂)$_y$—wherein y=2 to 5.

9. A membrane in accordance with claim 1 wherein Q is an alkenylated diphenylene having the general structural formula:

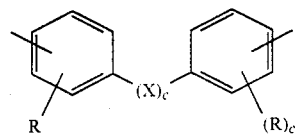

wherein each R is independently a vinyl or vinylaryl group; X is methylene, alkylene or $C_1$-$C_6$ branched alkylene group, oxygen, sulfur, sulfonyl, carbonyl, or fluoroalkylene and each c is independently 0 or 1.

10. A membrane in accordance with claim 9 wherein each R is a vinyl group.

11. A membrane in accordance with claim 9 wherein each R is an vinylaryl group.

12. A membrane in accordance with claim 1 wherein Q has the structural formula:

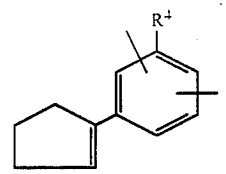

wherein $R^4$ is H or CH₃.

13. A membrane in accordance with claim 1 wherein Q has the structural formula:

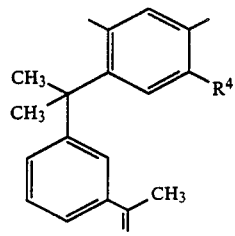
wherein $R^4$=H or $CH_3$.
14. A membrane in accordance with claim 1 wherein said polyimide also contains third polymerizable units of the formula:
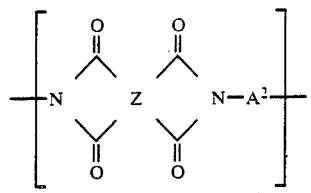
wherein N—A—N is an aromatic diamine; and Z is
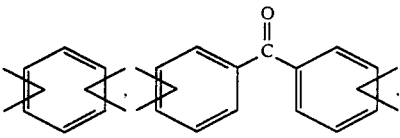
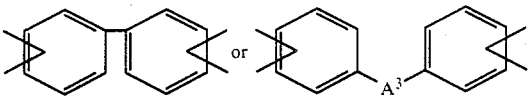
wherein $A^3$ is $C(CH_3)_2$, O, S or $SO_2$.
15. A membrane in accordance with claim 14 wherein said third polymerizable units make up to 95% of the total polymerizable units of the polyimide.
* * * * *